Dec. 19, 1950     C. H. BRADLEY     2,534,405
PEANUT HARVESTER
Filed Dec. 10, 1945     3 Sheets-Sheet 1
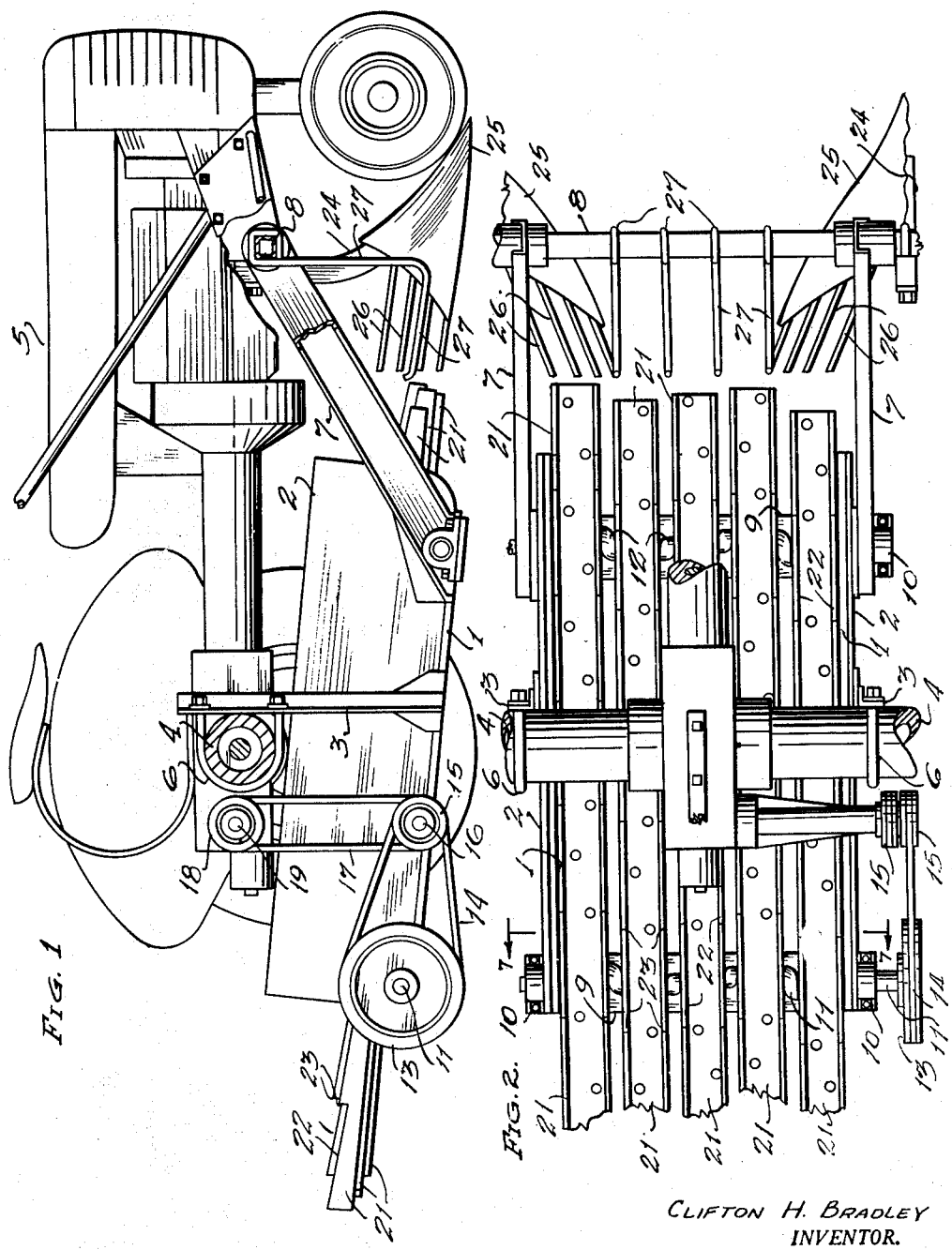
CLIFTON H. BRADLEY
INVENTOR.
BY
ATTORNEY Dec. 19, 1950     C. H. BRADLEY     2,534,405
PEANUT HARVESTER Filed Dec. 10, 1945     3 Sheets-Sheet 2

CLIFTON H. BRADLEY
INVENTOR.

BY

ATTORNEY

Dec. 19, 1950   C. H. BRADLEY   2,534,405
PEANUT HARVESTER
Filed Dec. 10, 1945   3 Sheets-Sheet 3
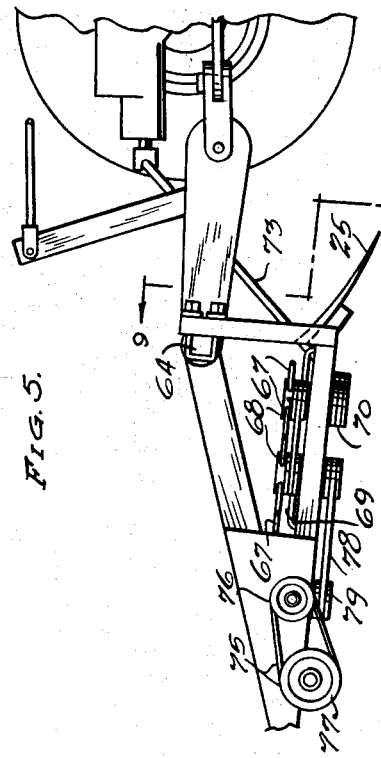
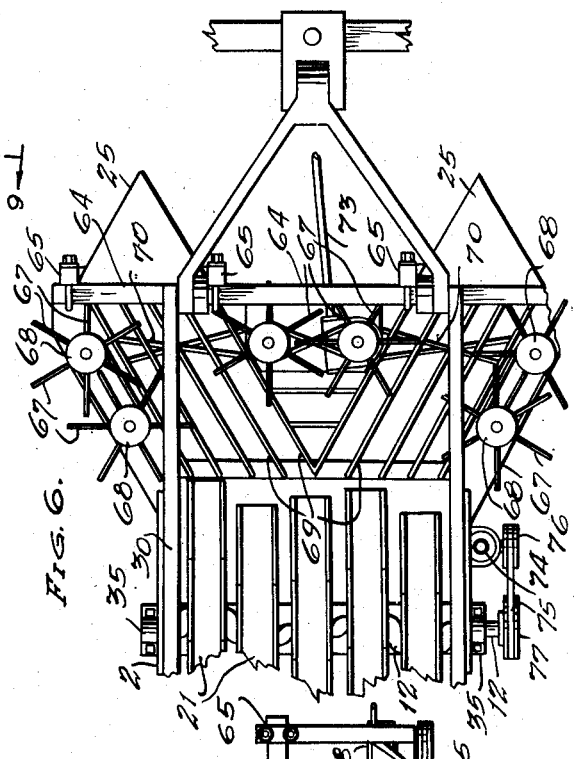
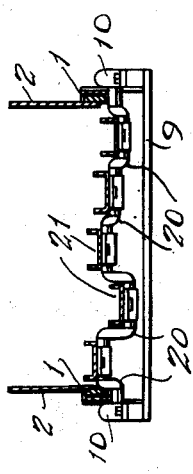
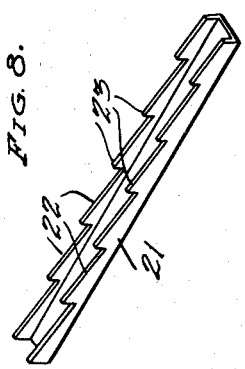
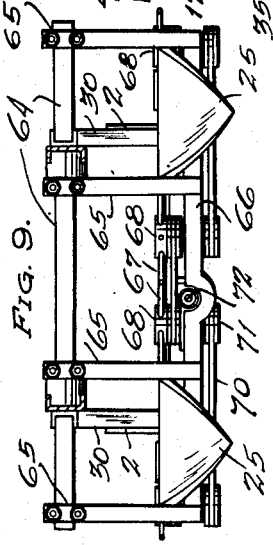
CLIFTON H. BRADLEY
INVENTOR.
BY
ATTORNEY Patented Dec. 19, 1950

2,534,405

UNITED STATES PATENT OFFICE 2,534,405

PEANUT HARVESTER

Clifton H. Bradley, Mansfield, Tex.

Application December 10, 1945, Serial No. 633,948

2 Claims. (Cl. 55—9)

This invention relates to harvesting equipment designed especially for row crops, such as peanuts, and the like, and its principal object resides in the provision of a mechanism capable of being attached to and supported on a tractor, or drawn thereby, in which is embodied an arrangement of parts whereby the assembly can be moved along a plurality of rows of growing plants to detach the same from the ground, substantially remove the soil therefrom and deposit the plants in wind-rows or convenient piles in the wake of the mechanism where the harvested product can be more easily picked up or handled through manual operations.

Another object of the invention resides in the provision of a peanut harvester possessing a novel arrangement of elements by which great savings in time and labor may be accomplished and increased profits realized from extra cleaning of the nuts resulting from the mechanized shaking or agitating thereof to remove the soil adhering thereto when the plants are detached from the ground, an operation usually accomplished by manual labor.

Still another object of the invention is manifest in the provision of a mechanism which is simple and inexpensive in design and construction and capable of operation by one person thus enabling an individual to perform the work ordinarily requiring the services of several persons.

Broadly, the invention seeks to comprehend the provision of apparatus whereby such row crops as peanuts, or the like, may be harvested more rapidly and economically thus affording a valuable aid to farmers engaged in the production of peanuts.

While the foregoing objects are paramount, other and lesser objects will become manifest as the description proceeds, taken in connection with the appended drawings wherein:

Figure 1 is an elevational view of one form of the invention shown attached to and supported by a tractor, the latter being shown with one rear wheel removed.

Figure 2 fragmentarily shows the invention in plan and illustrates portions of the tractor to which it is attached.

Figure 5 illustrates, in elevation, the front portion of the invention showing the hitch, shovels and driven spiders cooperating with the shovels.

Figure 6 is a fragmentary plan view of the invention showing the hitch, shovels, rotating spiders and forward portions of the agitator bars.

Figure 7 is a lateral cross-section of the agitator assembly, taken on lines 7—7 of Figure 2.

Figure 8 illustrates one of the agitator bars in perspective, and

Figure 9 is a lateral sectional view of the front of the invention, taken on lines 9—9 of Figure 5, showing the manner in which the shovels are attached to the frame and illustrating the driven spiders.

Figure 3:
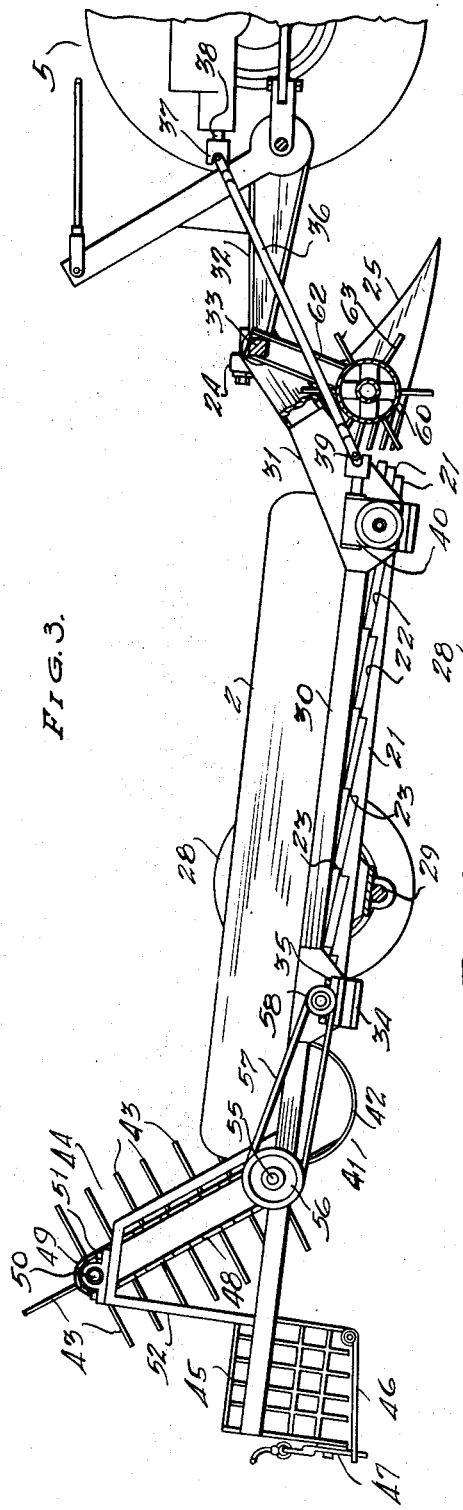
Figure 3 is a side elevational view of a modified form of the invention hitched to a tractor, the latter being shown fragmentarily, a wheel of the invention being removed therefrom.

Accordingly, therefore, the invention contemplates an assembly designed either for attachment directly to a tractor, as illustrated in Figures 1 and 2, or a separate wheeled structure capable of being trailed behind and operated by the tractor as shown in Figures 3 to 6, inclusive. In the former arrangement a frame structure is provided which comprises side members 1 arranged longitudinally of the assembly and having raised sides 2, preferably of sheet metal, attached thereto. Standards 3, secured at their lower ends to the frame members 1, partially support the assembly from the rear axle housing 4 of the tractor 5 to which the standards 3 are attached by U-bolts 6, or the like. The forward end of the structure is supported by angular braces 7 attached at their lower ends to the frame members 1 and at their upper ends to a tool bar 8 on the tractor 5.

The frame members 1 are transversely connected by bars 9 arranged across the front and rear ends of the frame members 1 and join the latter at each point beneath bearings 10 in which the ends of crank shafts 11 and 12 are journalled, as shown in Figures 2 and 7. The crank shafts 11 and 12 will be described in greater detail presently.

As apparent, particularly in Figure 1, a V-pulley 13 is secured on the end of the crank shaft 11 which is driven by a V-belt 14 and one of a dual set of V-pulleys 15 mounted on a stub shaft 16 attached to one of the frame members 1. Another V-belt 17 operates on the other V-pulley of the set 15 and over a driven pulley 18 on the power take-off shaft 19 of the tractor 5.

The crank shafts 11 and 12 have their several cranks 20 set at different radii from the axis of the shafts, as in Figure 7, and an agitator bar 21, illustrated in detail in Figure 8, is attached at each end to each of the cranks 20 of each crank shaft 11 and 12. Thus, when the shaft 11 is rotated by the pulleys and belts 13, 14, 15, 17 and 18 all of the agitator bars 21 are oscillated longitudinally and, by reason of their connection with the shaft 12 at their opposite end, each bar 21 is moved longitudinally in a rotary motion toward the rear of the assembly.

It will be observed that the bars 21 are inclined forwardly of the assembly and each is substantially U-shaped in lateral section, as shown in Figures 7 and 8, their raised edges being formed with long serrations 22 whose points 23 are directed rearwardly of the invention and tend to urge the plant products rearwardly as the bars 21 are rapidly oscillated in the manner just described. In being so treated the soil is shaken from the plants and the latter are deposited from the rear of the invention upon the ground.

Forwardly of the frame structure and supported by standards 24 are shovels or plows 25 which are spaced so that each is capable of plowing up or detaching a row of plants. It is desirable to set the plows 25 so that each is slightly to the outside of the drill so that the plants detached thereby are inclined toward the center between the plows 25 and guided upon the agitator bars 21 by a series of rods 26 extending rearwardly of each of the plows 25. A plurality of rods 27 are attached at their upper ends to the tool bar 8 and turned at right angles rearwardly and spaced in parallel arrangement whereby the foliage of the plants are caused to remain in the path of the agitator assembly. The standards 24, to which the plows 25 are attached, are secured at their upper ends to the tool bar 8 of the tractor 5.

Figure 4:
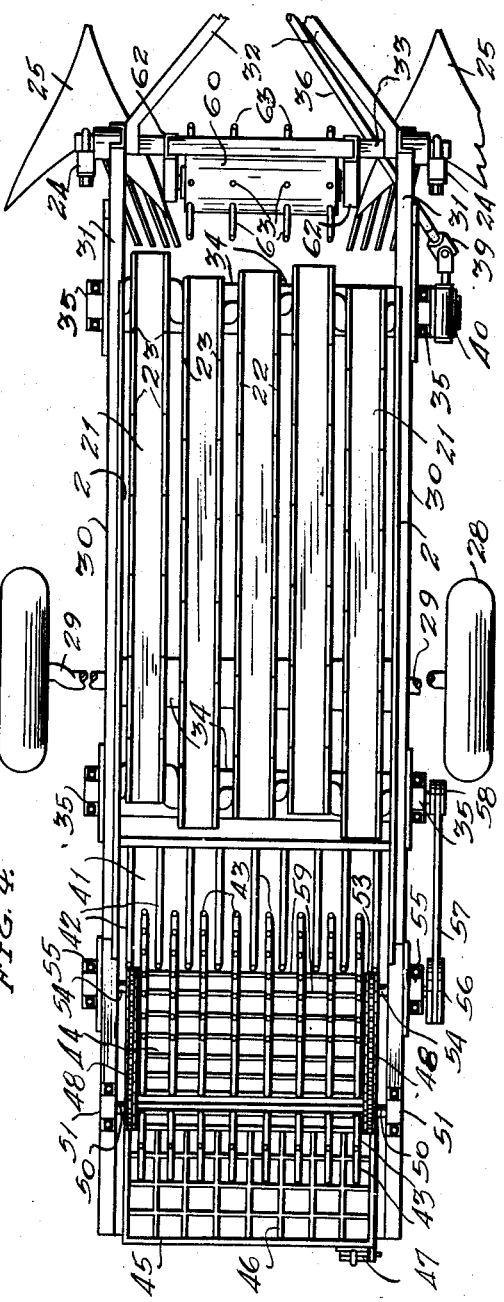
Figure 4 illustrates a plan view of the wheeled structure of the invention shown in Figure 3.

The modified form of the invention, illustrated in Figures 3, 4, 5, 6 and 9, is designed to be drawn by the tractor 5 and is independently mounted on wheels 28 on an axle 29 supporting frame members 30 longitudinally of the assembly, as shown particularly in Figures 3 and 4. Angularly arranged frame members 31 are attached to the front ends of the main frame members 30 and extend upwardly to connect to a hitch assembly 32 on the tractor 5. A lateral bar 33 connects the frame members 31 across the front of the invention, as illustrated in Figure 4, and the plows 25 are attached to standards 24 connected to the bar 33, much in the same manner as these members are connected to the assembly shown in Figures 1 and 2.

The frame members 30 are transversely connected by bars 34 and bearings 35 are secured to their ends in which the ends of the crank shafts 11 and 12 are journalled similarly to the arrangement of these members shown in Figures 1 and 2. Agitator bars 21 are connected to the cranks 20 of each of the shafts and operate in the same manner as in the structure previously described. The crank shafts 11 and 12 of the structures shown in Figures 3 and 4 are rotated by a shaft 36 having a universal connection 37 to the power take-off shaft 38 of the tractor 5 and a universal connection 39 to a worm and gear assembly 40 on one end of the crank shaft 12 forwardly of the invention. The shaft 11 is rotated by reason of its connection with the shaft 12 by the bars 21.

The modification of the invention shown in Figures 3 and 4 embodies a piling attachment for the harvested products which comprises a basket-like receptacle 41 of a series of spaced rods 42 arched downwardly and arranged so that the teeth 43 of an elevating conveyor 44 will pass between the rods 42 to pick up the plant products and convey them to a basket 45 supported on the rearmost end of the frame members 30 to be periodically dumped into piles of convenient size. A hinged bottom 46 is provided in the basket 45 and is secured by a suitable latch 47 which can be operated either automatically, by the weight or bulk of the product, or manually by a cable, or the like, accessible to the tractor operator.

The conveyor 44 comprises a pair of endless chains 48, each being arranged over a pair of sprockets 49 on each end of a shaft 50 journalled in bearings 51 on a subframe 52 above the frame 30, and driven by sprockets 53 on each end of a shaft 54 journalled in bearings 55 on each frame member 30. The shaft 54 is rotated by a pulley 56 and a belt 57 which latter is passed over a pulley 58 on the end of the crank shaft 11 which is driven by the shaft 12 through the connecting agitator bars 21, the latter being oscillated by this operation. A series of transverse rods 59 connect the chains 48 and the teeth 43 are integral therewith, as shown in Figures 3 and 4.

A modified arrangement for moving the detached plants upon the agitator assembly is shown in Figures 3 and 4 and consists of a rotary cylinder 60 freely mounted on a shaft 61 between the supporting standards 62 connected at their upper ends to the bar 33. The cylinder 60 has a plurality of rows of teeth 63 thereon which extend radially therefrom and engage the earth, as the invention advances, and picks up the detached plants and kicks them rearwardly upon the agitator assembly. This arrangement is merely optional, however, and may be desirable only under certain conditions.

In Figures 5, 6 and 9 the invention is modified only in its forward end, the frame arrangement, including the hitch assembly 32, being identical with the structure shown in Figures 3 and 4. The bar 33, however, is replaced by a longer bar 64 which extends beyond the frame members 30 to accommodate a pair of standards 65 for each of the plows 25 which, in this structure, are supported upon a cross-bar 66 attached to the lower ends of the standards 65 on each side of each of the plows 25, as shown in Figure 9.

In this arrangement the detached plants may pass between the standards 65 as the plows 25 raise them from the earth and be engaged by the fingers 67 on the spiders 68 and moved rearwardly toward the bars 21 of the agitator assembly. An open grill 69 provides a support for the products in passage to the agitator bars 21. The arrangement of spiders 68 is rotated in a horizontal plane by belts 70 connecting them to a driven vertical shaft 71 on which one of the spiders 68 is mounted, and the shaft 71 is driven by a worm and gear assembly 72 which has connection with a flexible shaft 73 rotated by the power take-off of the tractor 5, as in Figure 5. This arrangement is also employed to rotate the crank shaft 12 through a worm and gear assembly 74, or similar device, and belt 75 and pulleys 76 and 77. A belt 78 may be employed to drive the worm and gear assembly 74 by a V-pulley 79 on one of the shafts on which a spider 68 is mounted.

In operation, the invention, either attached to and supported by a tractor or drawn thereby as a separate unit, is moved along two rows of the row crop so that the plows 25, properly adjusted as to depth and set of point, will uproot the plants and direct them toward the middle. A plant such as peanuts, whose foliage is generally thick and closely knit, will be readily moved rearwardly of the invention as the latter advances, each plant forcing its predecessor along, aided by the spiders 68 or the teeth 63 of the cylinder 60, or some other arrangement, and as the plants are picked up by the agitator bars 21 the rearward oscillating motion of these members will carry the plants therealong, shaking out the soil as they progress, and deposit them either along the ground in neat rows, substantially clean, or in the piling receptacle or basket 45 on the rear of the invention where the plants can be left in neat piles at properly spaced intervals.

Obviously, certain changes and modifications in the design and operation of the invention may be made by persons skilled in the art, without departing from the spirit and intent of the invention or the scope of the appended claims.

What is claimed is:

1. In a harvester for peanuts, or the like, the combination with a tractor, a wheeled frame connected to said tractor and capable of being propelled thereby, a plurality of shovels spaced to place each in a drill row, an inclined grill integral with each shovel and extending rearwardly therefrom, rotary members having radial fingers thereon cooperating with said grills capable of engaging and moving products from said drill rows along said grills and means comprising a plurality of inclined parallel agitators extending rearwardly and upwardly from said grills removing the soil from said products as same are moved therealong to be deposited on the ground in windrows in the wake of said machine.

2. In a device for harvesting peanuts, and similar row crops, in combination with a tractor, a frame connected to said tractor having a pair of shovels attached thereto and spaced to engage a pair of drill rows to plow up the plants in each row, a plurality of parallel agitators arranged longitudinally of the said rows and rearwardly of said shovels capable of receiving and shaking the said plants and dropping the same rearwardly of the assembly, grills extending rearwardly of said shovels and cooperating with said agitators for conducting said plants thereto, rotating elements arranged in operative relationship to said grills urging the detached plants rearwardly along said grills to said agitators and means providing for driving said agitators and rotating elements by said tractor.

CLIFTON H. BRADLEY.

REFERENCES CITED

The following references are of record in the file of this patent:

UNITED STATES PATENTS

| Number | Name | Date |
|---|---|---|
| 1,357,115 | Phillips | Oct. 26, 1920 |
| 2,297,065 | McLendon | Sept. 29, 1942 |